Sept. 17, 1963 M. B. STEVENS 3,104,040
ARTICLE HOLDER FOR AUTOMOBILE FLOORS
Filed Sept. 29, 1959 2 Sheets-Sheet 1
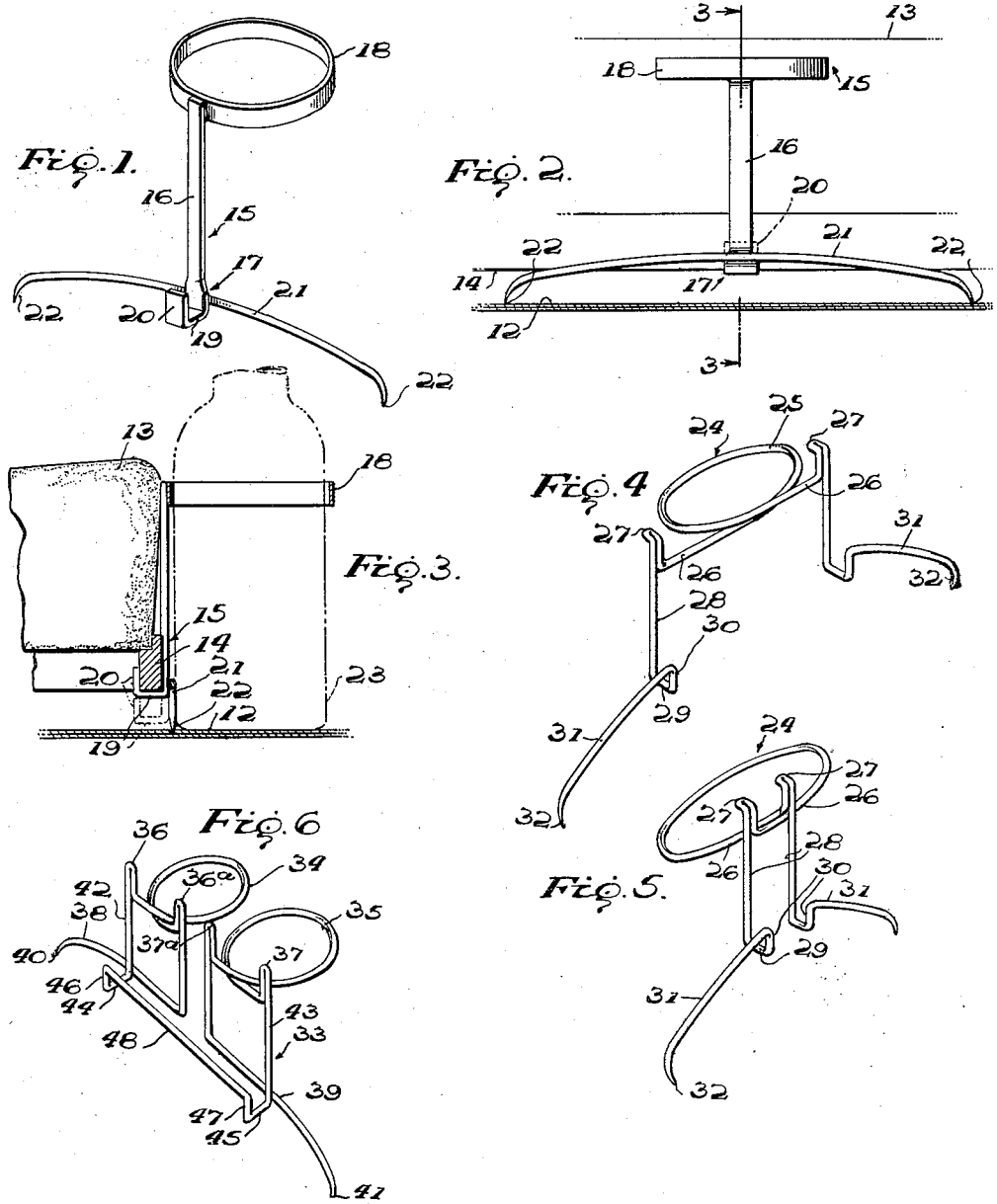
INVENTOR
Myron B. Stevens
BY
W. J. Eulestorn
ATTORNEY Sept. 17, 1963 M. B. STEVENS 3,104,040
ARTICLE HOLDER FOR AUTOMOBILE FLOORS
Filed Sept. 29, 1959 2 Sheets-Sheet 2
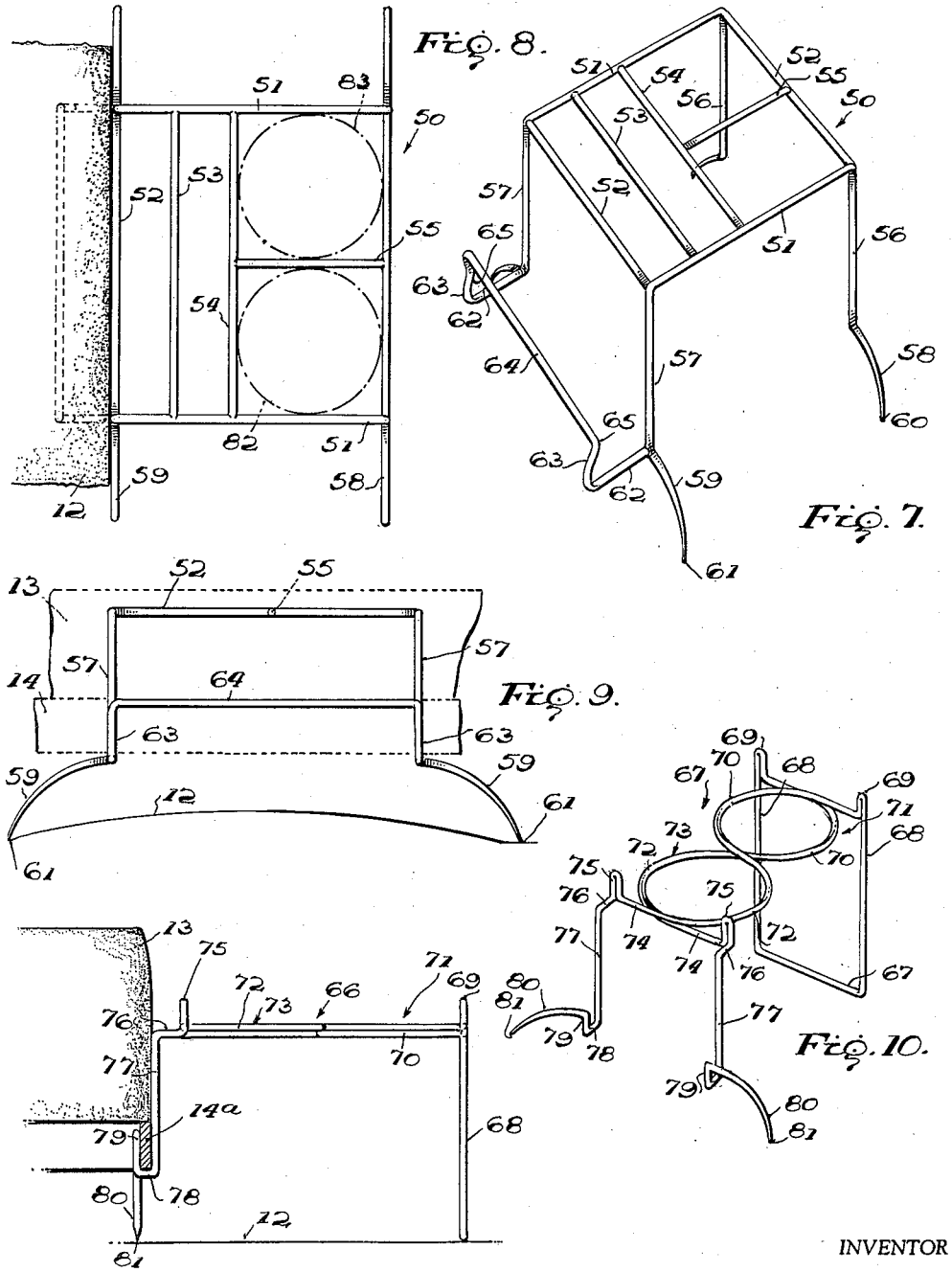
INVENTOR
*Myron B. Stevens*
BY *W. J. Eccleston*
ATTORNEY United States Patent Office 3,104,040
Patented Sept. 17, 1963

1

3,104,040
ARTICLE HOLDER FOR AUTOMOBILE FLOORS
Myron B. Stevens, 900 Sonoma Lane, Bethesda, Md.
Filed Sept. 29, 1959, Ser. No. 843,313
11 Claims. (Cl. 224—29)
(Granted under Title 35, U.S. Code (1952), sec. 266)

The invention described herein, if patented, may be manufactured and used by or for the Government for governmental purposes, without the payment to me of any royalty thereon.

The invention relates to article holders for use on the floors of vehicles and more particularly for use on the floors of automobiles in connection with one of the seats thereof. As is well known automobiles include a substantially low front seat which comprises a seat cushion supported on a seat frame defined at the front by a lower front seat base member which is slightly spaced from the floor of the automobile or at least from the tunnel housing the driveshaft or the like.

On trips of any substantial distance, it is extremely important to have a holder for articles which is convenient to the hand of the driver yet will not interfere with his vision or the operation of the vehicle. For instance, a road map or maps should be convenient, together with a holder for a thermos bottle for coffee or a canteen for water or like articles. Holders such as these have been utilized in connection with the dash board in the past but these usually interfere with the leg room of the passenger and/or will not fit on every make or model of vehicle. Also such devices usually require substantial modification of the vehicle to permit their attachment.

With the foregoing in view, it is an object of the invention to provide an improved article holder for the floor of a vehicle.

A further object is to provide such an improved article holder which is applicable to the vehicle without the necessity for any structural modification or the use of any special tools or skills.

A further object is to provide such a holder which is held in position relative to the vehicle floor by resilient means.

A still further object is to provide a holder such as that last described wherein the resilient means includes floor engaging means resisting lateral movement of the holder relative to the floor.

A still further object is to provide an article holder for a vehicle wherein the holder itself includes a resilient annular portion which engages the article or articles held.

A further object includes in a holder such as that last described, means readily releasing the resilient holder portion from its grip on the article.

Other objects and advantages reside in the particular structure of the invention, the structure of the several elements thereof, combinations and sub-combinations of such elements with each other and/or with a vehicle, all of which will be readily apparent to those skilled in the art upon reference to the attached drawings showing a plurality of species of the invention and in connection with the following specification wherein the invention is described and claimed.

In the drawing:

FIGURE 1 is a perspective view of one form of the invention;

2

FIGURE 2 is a front elevational view thereof;
FIGURE 3 is a longitudinal vertical sectional view taken substantially on the plane of the line 3—3 of FIGURE 2;
FIGURE 4 is a perspective view of a modification, the holder being shown in the contracted position;
FIGURE 5 is a like view of the modification, the holder being shown in the expanded position;
FIGURES 6 and 7, are perspective views of further modifications of the invention;
FIGURE 8 is a top plan view of the modification of FIGURE 7;
FIGURE 9 is a rear elevational view thereof;
FIGURE 10 is a perspective view of a still further modification of the invention; and
FIGURE 11 is a side elevational view of the modification of FIGURE 10, parts of the supporting structure being shown in cross section.

Referring specifically to the drawing wherein like reference characters designate like parts in all views and referring at first to the species of FIGURES 1 to 3 inclusive, 12 designates generally the floor of a vehicle preferably an automobile. The automobile includes a seat cushion 13 which is supported by a seat base which includes a front lower edge 14 which is in slightly spaced relation to the floor 12. In this species of the invention, the article holder 15 comprises a shank 16 having a rearwardly directed hook 17 at the lower end thereof. The upper end of the shank 16 has rigidly secured thereto a forwardly directed annular holder 18. The hook 17 includes a bight portion 19 which has a length substantially equal to the thickness of the front lower edge of the seat base and a bill portion 20 which extends along the rear surface of the lower edge 14. Also, the height of the bill 20 is such that it may be passed below the front edge 14 between the same and the floor 12. To secure the hook in engagement with the front edge 14 a resilient means 21 has been provided in the form of an elongated spring having a central portion rigidly secured in any suitable manner, as by welding, to the lower portion of the shank 16. The spring 21 includes downwardly directed free ends 22 which are preferably pointed so as to partially penetrate the floor mat or the floor 12 whereby to resist lateral movement of the holder 15 relative to the floor. Of course, the spring 21 is sufficiently strong to hold the bight 19 of the hook 17 securely against a lower edge 14 of the seat base whereby fore and aft movement of the holder relative to the floor 12 is positively prevented. In this connection, it should be pointed out that the annulus 18 which actually holds the article 23 is sized for a loose fit therewith, with the article itself resting on the floor 12 as suggested in broken lines in FIGURE 3. Thus, spring 21 does not support the article but only the lighter holder 15. The spring 21 is relatively long compared to the height of the device to provide stabilizing and anti-tilting means for the holder. This action is enhanced by the wide spacing between the floor engaging points 22.

FIGURE 4 illustrates a species formed from a single piece of spring wire. Here the holder 24 comprises a horizontally disposed loop 25 having oppositely directed ends 26 which cross and then are upwardly and forwardly directed to provide finger grips 27 on opposite sides of the loop 25. It is obvious that if the finger grips 27 are pressed towards each other, as in FIGURE 5, loop 25 will be expanded to permit the insertion of an article therein. Upon release of the finger grips 27 the loop 25 closes once more and resiliently grips the article therein. The wire extensions forming the finger grips 27 are continued downwardly, rearwardly and upwardly to provide successively hook shanks 28, hook bights 29 and hook bills 30. The bills 30 are thereafter extended laterally in opposite directions to provide resilient members 31 which terminate in downwardly directed points 32 for engaging the floor mat. This species of the invention operates in the same manner as the species of FIGURES 1 to 3, except for the resilient gripping of the article by the loop 25 plus the fact that the springs 31 and pointed ends 32 thereof are disposed rearwardly of the seat base member 14 where they are unlikely to be disturbed by the feet of an occupant.

The species of FIGURE 6 is adapted to hold two separate articles. Here again the holder which is generally designated by 33 comprises a single spring wire formed to provide two resilient loops 34 and 35 which are transversely aligned. Loops 34, 35 each have crossed ends which include portions turned upwardly to provide outer and inner finger grips 36, 36a and 37, 37a respectively on opposite sides of their article holding loops. Extensions of innermost finger grips 36a and 37a are downwardly directed and then laterally directed to provide left and right hand spring members 38 and 39 respectively which terminate with the usual downwardly directed floor-engaging pointed ends 40 and 41. Extensions of the outermost finger grips 36 and 37 are downwardly, rearwardly and upwardly directed to provide hook shanks 42 and 43, hook bights 44, 45 and hook bills 46 and 47. A terminal or bight portion 48 of the spring wire connects the bills 46 and 47. This species of the invention operates in the same manner as the species of FIGURE 4 and FIGURE 5 but here the spring members 38 and 39 extend along the front of the seat base member 14 as in the first described species. Also, the arrangement of finger grips permits each loop 34 or 35 to be expanded individually.

FIGURES 7, 8 and 9 illustrate still another species of the invention wherein the holder 50 comprises a top frame portion of generally rectangular configuration including side frame members 51 and front and rear transverse members 52. Intermediate transverse frame members 53 and 54 divide the rear half of the holder 50 into relatively narrow pockets capable of holding road maps, technical manuals, books or the like. A longitudinal frame member 55 connects the front transverse member 54 with the front frame member 52 centrally thereof to provide two substantially square compartments capable of supporting thermos bottles, nursing blottles or the like 83, 82. The top frame is supported above the floor of the vehicle by depending front and rear leg members 56 and 57 respectively. The front leg members 56 terminate in laterally outwardly directed spring portions 58 which terminate in downwardly directed pointed free ends 60. In like manner the rear leg members 57 terminate in laterally outwardly directed spring members 59 which likewise terminate in downwardly directed pointed free ends 61. The lower ends of the rear legs 57 have secured thereto in any suitable manner, such as welding or the like, rearwardly directed bight portions 62 of upwardly directed hook bills 63 which may be connected by a bight portion 64. The hook bills 63 may be forwardly bowed as at 65 to provide cams which engage the seat base edge portion 14. Thus when the hooks are applied to the edge 14 of the seat the cams 65 spring the bills rearwardly slightly so that they resiliently grip the lower edge 14 whereby to secure the device in place more securely. Otherwise, the device operates as in the previously described species with the exception that the holder is capable of holding a number of articles of different size and shape.

In the species of FIGURES 10 and 11, a holder similar to that shown in FIGURE 6 is disclosed with the exception that the two article holders are in longitudinal alignment rather than being transversely aligned. Here the holder 66 comprises a single piece of spring wire which is formed to provide front and rear horizontally disposed loops 71, 73. Holder 66 commences with a floor engaging bight 67, having its outer ends upwardly directed as at 68 to provide legs. The upper ends of the legs 68 are formed to provide finger grips 69 which include downwardly and laterally oppositely directed extensions which cross and are thereafter oppositely arcuately curved as at 70 to provide a substantially annular forward article holder generally designated by 71. The arcuate portions 70 cross rearwardly and are continued rearwardly and outwardly as reversely curved portions 72 which define a rear article holder generally designated by 73. Thus, the holders 71, 73 taken together define a figure eight. The arcuate portions 72 are again crossed rearwardly to provide laterally oppositely directed portions 74 which are upwardly directed on opposite sides of the rear holder 73 to provide finger grips 75. Terminal portions of finger grip 74 are rearwardly directed as at 76 to space the finger grips 75 slightly forwardly of the seat 13, FIGURE 11. Extensions of the terminal portions 76 are downwardly directed to provide shanks 77 which terminate in rearwardly directed hook bights 78 which in turn are formed with upwardly directed hook bills 79. The upper ends of the hook bills 79 are laterally outwardly directed to provide arched springs 80 which terminate with the downwardly directed pointed free ends 81. This species of the invention functions in generally the same manner as the species of FIGURE 6 in that the separate article holders 71 and 73 may each be individually expanded by the finger pieces 69 or 75 to release or grip an article inserted therein. Here the hook bights 78 are shorter than before to fit the narrow front base member 14a. As in the species of FIGURES 4 and 5, the springs 80 are disposed rearwardly of the seat frame member 14a.

As is apparent from the foregoing, the several species of the article holder described hereinabove are all at least partially secured to the seat frame member 14 or 14a by the upwardly directed spring pressure of the laterally directed spring members thereof. Likewise, each species of the holder provides its spring members with downwardly directed pointed free ends which will dig into the rubber mat of the vehicle to prevent lateral movement of the holder relative thereto. Also, in all forms of the invention, the floor-engaging points are widely spaced relative to the heights of the holders to provide stabilizers to prevent tilting as well as lateral movement. Fore and aft movement of the holder is, of course, prevented by the positive engagement of the hook bills behind the seat frame members 14 or 14a.

All species of the invention may be applied to the vehicle simply by flattening out the springs until the hook bills can pass below the front members 14 or 14a. Where the members 14 and 14a are too low to permit any sort of hook bill to pass therebelow, in a rearward direction, as when the drive shaft tunnel is unusually high, an alternate method of applying the holders must be used. Here the hook or hooks are applied to members 14 or 14a laterally of the drive shaft tunnel where such member is more widely spaced from the floor 12. Thereafter, the appropriate pointed spring end is manually raised out of engagement with the floor to permit the entire holder to be slid laterally into position astride the shaft tunnel. In an instance such as this, of course, it is not necessary for the hook to be held elevated by spring pressure. Consequently the laterally extending members need not be made of spring material. They need only enough resilience to maintain the pointed ends thereof in engagement with the floor mat.

It thus appears that each of the several species is operative to secure one or more articles in a vertical position on the floor 14 of the vehicle within easy reach of the driver. In this connection, it is understood that the holder will normally be disposed centrally of the seat and of the driveshaft tunnel which is a location seldom occupied by a passenger. Even if a third passenger is carried in that portion of the seat 13 he can easily straddle the article holder.

Moreover, while there have been shown and described what are now considered to be the preferred embodiments of the invention, it should be understood that the same is susceptible of still other forms and expressions. Consequently, the invention is not considered as being limited to the several species shown and described hereinabove but only as hereinafter claimed.

I claim:

1. An article holder for use in a vehicle having a floor and a seat base having a forward lower edge in upwardly spaced relation to said floor; said article holder including means adapted to encircle at least one article seated on said floor, said holder including rearwardly directed hook means adapted to embrace said forward lower edge of said seat base to secure said holder against fore and aft movement relative to said floor, said hook means including integral laterally oppositely outwardly extending anchor means, and said anchor means terminating in widely spaced points adapted to normally engage said floor to prevent tilting and lateral movement of said holder on said floor.

2. An article holder for use in a vehicle having a floor together with a seat base including a front lower edge in upwardly spaced relation to said floor; said article holder comprising means adapted to encircle at least one article seated on said floor, rearwardly directed hook means carried by said article holder below said means and adapted to embrace said front lower edge of said seat base to secure said holder against fore and aft movement relative to said floor, resilient means fixed to said hook means and extending laterally outwardly of the same in opposite directions, said resilient means including substantially widely spaced downwardly directed free ends adapted to frictionally engage said floor to retard lateral movement of said holder relative to said floor, and said resilient means including upwardly arched central portions adapted to resiliently secure said hook means in engagement with said front lower edge of said base.

3. An article holder for use in an automobile or the like having a floor and a seat base having a front lower edge in upwardly spaced relation to said floor; said holder comprising front and rear horizontally disposed spring wire expansible loops made from a single length of wire, said rear loop having crossed rear ends, said ends being downwardly rearwardly and upwardly directed in laterally spaced and parallel relation to provide shank and bill portions of a resilient hook adapted to resiliently engage said front lower edge of said seat base, said front loop having crossed front ends, said front ends extending downwardly and adapted to engage said floor, and said loops comprising holders adapted to resiliently embrace articles inserted therein.

4. The article holder of claim 3, wherein each pair of crossed loop ends includes laterally spaced finger pieces operative to expand said loops when moved toward each other.

5. A holder for articles for use in an automobile having a floor and a seat base provided with a forward lower edge in upwardly spaced relation to said floor; said article holder comprising at least two horizontally disposed expansible spring wire loops made from a single length of wire, said loops having crossed ends, finger pieces on said crossed ends for manually and selectively expanding each loop, each loop being adapted to resiliently embrace an article inserted therein, rearwardly directed hook means carried by said loops below the same and adapted to embracingly engage said forward lower edge of said seat base, and resilient means adapted to engage said floor and resiliently retain said hook means in engagement with said lower edge of said seat frame.

6. An article holder according to claim 1, wherein said article holding means comprises a frame carried by said shank means above said hook means and extending forwardly of said shank means, said frame including spaced front and rear frame members, said frame including support means in the region of said front frame member and adapted to engage said floor to support said frame thereabove, at least one frame member extending transversely thereof in slightly spaced relation to said rear frame member to provide a holder for relatively flat articles, and a longitudinally extending frame member connecting said last named transverse frame member and said front frame member to provide two laterally spaced article holders.

7. An article holder for use in a vehicle having a floor and a seat base provided with a front lower edge in upwardly spaced relation to said floor; said holder comprising at least one article holding loop, shank means carried by said loop and depending therefrom, said shank means including means formed to provide a rearwardly directed hook portion adapted to embracingly engage said front lower edge of said seat base, resilient means adapted to engage said floor and resiliently retain said hook in engagement with said front lower edge of said seat base, said resilient means including stabilizers fixed to said hook and extending laterally outwardly of the same in opposite directions, and said stabilizers including substantially widely spaced free ends adapted to frictionally engage said floor to prevent lateral movement of said holder thereon.

8. An article holder for use in a vehicle having a floor and a seat base including a front lower edge in upwardly spaced relation to said floor; said article holder comprising at least one spring wire loop having crossed ends, both of said ends being downwardly rearwardly and upwardly directed to provide respectively shank, bight and bill means of hook means adapted to engage said front lower edge of said seat base, spring means integral with said hook means and extending laterally thereof in opposite directions, said spring means loading said hook means into engagement with front lower edge, and said loop being adapted to resiliently engage an article inserted therein.

9. An article holder for a vehicle having a floor together with a seat base including a front lower edge in upwardly spaced relation to said floor; said article holder comprising a single length of resilient material formed to provide a rearwardly directed hook bill portion and an upwardly directed hook shank portion, there being two portions carried by said holder and extending laterally oppositely of said hook bill portion, said last portions having free ends adapted to engage said floor and urge said hook bill portion into resilient engagement with said front lower edge of said seat base, there being at least one resilient expansible wire loop portion carried by said shank portion above said hook portion, said loop portion extending forwardly of said shank portion, and said loop portion being adapted to resiliently embrace an article inserted therein.

10. An article holder for a vehicle having a floor together with a seat base including a front lower edge in upwardly spaced relation to said floor; said article holder comprising a single length of resilient material formed to provide an upwardly directed hook shank portion, a rearwardly directed hook bight portion and an upwardly directed hook bill portion, said hook bill portion terminating in two extensions extending laterally thereof in opposite directions, said extensions having free ends adapted to engage said floor and urge said hook bight portion into resilient engagement with said front lower edge of said seat base, and at least one article holding portion extending forwardly of said shank portion.

11. An article holder for a vehicle having a floor together with a seat base including a front lower edge in upwardly spaced relation to said floor; said article holder comprising a single length of resilient material formed to provide two upwardly directed shank portions, said shank portions having upper ends terminating in at least one forwardly extending article holding portion, said shank portions having lower ends terminating in rearwardly extending hook bight portions which in turn terminate in upwardly extending hook bill portions, said hook bill portions terminating in laterally oppositely extending extensions, and said extensions having free ends adapted to engage said floor and urge said hook bight portions into resilient engagement with said front lower edge of said seat base.

References Cited in the file of this patent

UNITED STATES PATENTS

| | | |
|---|---|---|
| 713,156 | Saberhagen | Nov. 11, 1902 |
| 910,158 | Walker | Jan. 19, 1909 |
| 2,242,833 | Nibur | May 20, 1941 |
| 2,522,477 | Wexberg et al. | Sept. 12, 1950 |
| 2,589,611 | Hay | Mar. 18, 1952 |
| 2,708,062 | Poyer | May 10, 1955 |
| 2,774,480 | Buerger | Dec. 18, 1956 |
| 2,898,170 | Antoniks | Aug. 4, 1959 |
| 2,904,299 | Dalton | Sept. 15, 1959 |